US012693250B2

(12) United States Patent
Nakatsu et al.

(10) Patent No.: US 12,693,250 B2
(45) Date of Patent: Jul. 28, 2026

(54) OIL STATE DETECTION APPARATUS

(71) Applicant: NIPPON PILLAR PACKING CO., LTD., Osaka (JP)

(72) Inventors: Akira Nakatsu, Osaka (JP); Kento Nakagawa, Osaka (JP); Kentaro Watanabe, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 64 days.

(21) Appl. No.: 18/075,260

(22) Filed: Dec. 5, 2022

(65) Prior Publication Data

US 2023/0175994 A1     Jun. 8, 2023

(30) Foreign Application Priority Data

Dec. 6, 2021     (JP) .................................. 2021-197792

(51) Int. Cl.
| | |
|---|---|
| *G01N 27/02* | (2006.01) |
| *G01N 27/22* | (2006.01) |
| *G01N 27/74* | (2006.01) |

(52) U.S. Cl.
CPC ......... *G01N 27/023* (2013.01); *G01N 27/221* (2013.01); *G01N 27/74* (2013.01)

(58) Field of Classification Search
CPC .. G01N 27/023; G01N 27/025; G01N 27/221; G01N 27/74; G01N 33/2858; G01N 33/2888
USPC ......................................... 324/658, 663–690
See application file for complete search history.

(56) References Cited

U.S. PATENT DOCUMENTS

| | | | | |
|---|---|---|---|---|
| 4,459,561 A | * | 7/1984 | Clark ...................... | G01V 3/101 |
| | | | | 331/65 |
| 5,245,295 A | | 9/1993 | Hata et al. | |
| 5,268,646 A | * | 12/1993 | Doss .................... | G01N 27/023 |
| | | | | 324/633 |
| 5,543,722 A | * | 8/1996 | Suzuki ............... | G01N 33/2852 |
| | | | | 324/682 |
| 5,594,163 A | | 1/1997 | Suzuki | |
| 5,604,441 A | | 2/1997 | Freese, V et al. | |
| 5,656,767 A | | 8/1997 | Garvey, III et al. | |
| 10,996,210 B2 | * | 5/2021 | Potyrailo ............. | G01N 27/026 |

(Continued)

FOREIGN PATENT DOCUMENTS

| | | | | |
|---|---|---|---|---|
| CN | 110133062 A | | 8/2019 | |
| CN | 112542993 A | * | 3/2021 | ............... H03B 5/04 |

(Continued)

OTHER PUBLICATIONS

Liu; Translation of CN 112542993 A; Mar. 23, 2021; EPO & Google (Year: 2021).*

(Continued)

*Primary Examiner* — Alesa Allgood
*Assistant Examiner* — Rahul Maini
(74) *Attorney, Agent, or Firm* — Maschoff Brennan

(57)     ABSTRACT

An oil state detection apparatus detects the amount of degradation substances contained in oil. The oil state detection apparatus includes a first oscillation circuit including a coil 1 and a capacitor 2, and a first detection device. Either one of the coil 1 or the capacitor 2 is configured to be immersed in oil. The first detection device is configured to detect the oscillatory frequency of the oscillation circuit.

12 Claims, 10 Drawing Sheets

(56) References Cited

U.S. PATENT DOCUMENTS

| | | | | |
|---|---|---|---|---|
| 2002/0140470 A1* | 10/2002 | Aoki | .................... | H03L 7/095 |
| | | | | 327/157 |
| 2019/0334631 A1* | 10/2019 | Young | ................. | H04B 17/318 |
| 2021/0143786 A1 | 5/2021 | Aizawa et al. | | |
| 2022/0038105 A1* | 2/2022 | Mukherjee | ............. | H03L 7/099 |

FOREIGN PATENT DOCUMENTS

| | | | | | |
|---|---|---|---|---|---|
| JP | H04-034414 | U | | 3/1992 | |
| JP | H06-097246 | B | | 11/1994 | |
| JP | H07272134 | A | * | 10/1995 | |
| JP | H07-306172 | A | | 11/1995 | |
| JP | H09-172386 | A | | 6/1997 | |
| JP | H09-229747 | A | | 9/1997 | |
| JP | 2003-114206 | A | | 4/2003 | |
| JP | 2018-105759 | A | | 7/2018 | |
| JP | 2018-155504 | A | | 10/2018 | |
| WO | WO-2005100757 | A1 | * | 10/2005 | ............. F01M 11/10 |
| WO | WO-2005111615 | A1 | * | 11/2005 | ............. B03C 1/015 |
| WO | WO-2007121879 | A1 | * | 11/2007 | ......... G01N 15/0656 |

OTHER PUBLICATIONS

Liu; Translation of Jp H07272134 A; Oct. 20, 1995; EPO & Google (Year: 1995).*

Fujii; Translation of WO 2005100757 A1; Oct. 27, 2005; EPO & Google (Year: 2005).*

Meindorf; Translation of WO 2007121879 A1; Nov. 1, 2007; EPO & Google (Year: 2007).*

Partial European Search Report dated Mar. 24, 2023 as received in Application No. 22211434.0.

EP Office Action dated Apr. 12, 2024 as received in Application No. 22211434.0.

Extended European Search Report dated Jul. 20, 2023 as received in Application No. 22211434.0 .

European Summons to attend oral proceedings dated Apr. 16, 2025 as received in Application No. 22211434.0.

JP Office Action dated May 13, 2025 as received in Application No. 2021-197792.

* cited by examiner

AMOUNT OF MAGNETIC SUBSTANCES

OIL STATE DETECTION APPARATUS

BACKGROUND

The present disclosure relates to an oil state detection apparatus configured to detect an amount of degradation substances contained in oil.

There are known methods of determining degradation of oil used as lubricant for vehicles and construction machinery.

For example, in Japanese Utility Model Publication No. H4-34414, a magnet is provided to a container for containing lubricant therein, and is configured to adsorb metal in the lubricant, and a flux density of the magnet is detected to determine degradation of the lubricant. In Japanese Unexamined Patent Publication No. 2003-114206, AC voltages of two types of frequencies are applied between electrodes in pair of a capacitive sensor while the electrodes are immersed in engine oil, interelectrode capacitances of the electrodes at the respective frequencies are measured, and degradation of the engine oil is determined based on a dielectric constant determined from each interelectrode capacitance and a difference between the dielectric constants.

SUMMARY

Operations of vehicles and construction machinery results in that parts thereof rub against each other to wear. Thus, by detecting the amount of degradation substances in oil (lubricant) used in vehicles and construction machinery, the state of wear of the parts in the vehicles and construction machinery and the state of degradation of the oil can be determined, so that break-down be avoided in advance. Examples of the degradation substances include metal powders generated by wear of the vehicles and construction machinery, and if such degradation substances are contained in the oil by a certain amount or more, this would mechanically damage the parts. Examples further include substances which relate to degradation of oil, such as substances (e.g., water) which itself cause degradation of oil, and substances (e.g., sludgh) which are generated by oxidation of oil, and such substances shorten the life of oil or inhibit the performance of oil. These degradation substances usually include a magnetic substance, a dielectric substance, a conductor, and the like.

An object of the present disclosure is to provide an oil state detection apparatus which can detect the amount of degradation substances contained in oil.

In order to achieve the object, the oil state detection apparatus according to one aspect of the present disclosure includes: a first oscillation circuit including a first coil and a first capacitor, and a first detection device, either one of the first coil or the first capacitor being configured to be immersed in oil, and the first detection device being configured to detect an oscillatory frequency of the first oscillation circuit.

With this configuration, either one of the first coil or the first capacitor constituting the first oscillation circuit is immersed in oil. The oscillatory frequency of the first oscillation circuit is determined by the inductance value of the first coil and the capacity value of the first capacitor. However, when the amount of the degradation substances (the magnetic substances or the dielectric substances) contained in the oil increases, the oscillatory frequency of the first oscillation circuit changes with the amount of the increase. By detecting the oscillatory frequency by the first detection device, the amount of the degradation substances contained in the oil can be detected.

According to the present disclosure, the amount of degradation substances contained in oil can be detected.

DETAILED DESCRIPTION

Hereinafter, embodiments of the present disclosure will be described in detail with reference to the drawings. The following embodiments are merely exemplary ones in nature, and are not intended to limit the scope of the present disclosure, nor applications or use thereof.

First Embodiment

Figure 1:
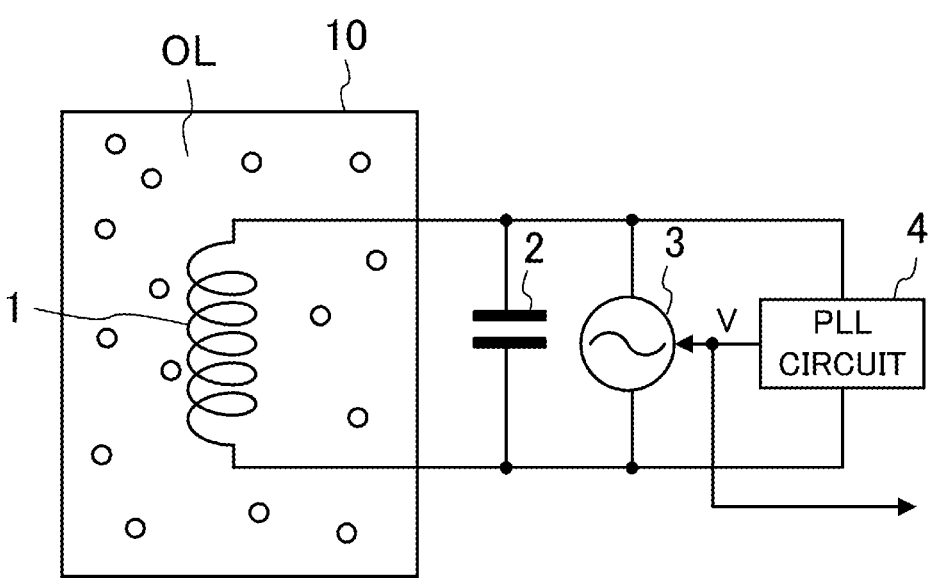
FIG. 1 is a block diagram illustrating an oil state detection apparatus according to a first embodiment.

FIG. 1 is a block diagram illustrating an oil state detection apparatus according to the first embodiment. As illustrated in FIG. 1, this oil state detection apparatus includes a coil 1 (first coil), a capacitor 2 (first capacitor), an oscillator (e.g., a voltage-controlled oscillator (VCO)) 3, and a phase-locked loop (PLL) circuit 4. The oscillator 3 and the PLL circuit 4 correspond to a first detection device.

As illustrated in FIG. 1, the coil 1 is for being disposed inside a case 10 filled with oil OL (lubricant). The case 10 may be, for example, an oil pan or an oil tank, serving for circulation of the oil OL in vehicles and construction machinery. As an alternative, the case may be a gearbox or a gearbox casing, serving for retaining therein the oil OL in vehicles and construction machinery. The coil 1 is immersed in the oil OL inside the case 10. Thus, an inductance of the coil 1 changes in accordance with the amount of magnetic substances contained in the oil OL.

Here, an oscillatory frequency F of an oscillation circuit including the coil 1 and the capacitor 2 (the oscillation circuit corresponds to a first oscillation circuit, and hereinafter, such an oscillation circuit including the coil 1 and the capacitor 2 would be simply referred to as the "oscillation circuit") is represented by the following equation:

$$F = \frac{1}{2\pi\sqrt{L \cdot C}} \tag{1}$$

where L is the inductance of the coil 1, and C is the capacity of the capacitor 2.

The PLL circuit 4 provides a tuning voltage V to the oscillator 3 so that the output frequency output by the oscillator 3 may satisfy the equation (1).

Figure 2:
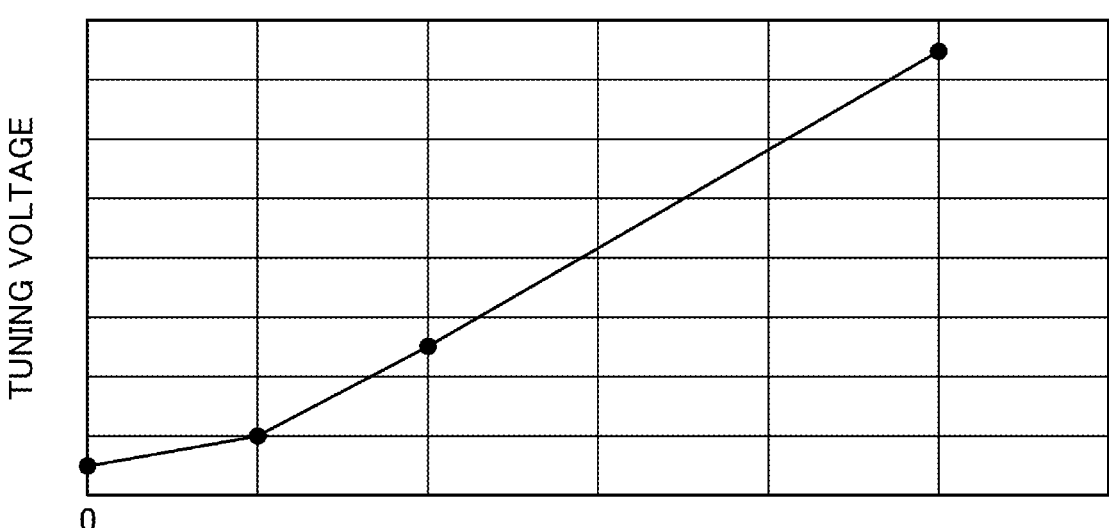
FIG. 2 is a graph showing a relationship between a tuning voltage V and an amount of magnetic substances contained in oil according to the first embodiment.

FIG. 2 is a graph illustrating the relationship between the tuning voltage V and the amount of magnetic substances contained in oil. In FIG. 2, the vertical axis indicates the tuning voltage V, and the horizontal axis indicates the amount of magnetic substances.

As illustrated in FIG. 2, as the amount of the magnetic substances increases, the voltage value of the tuning voltage V increases. This is because the inductance L of the coil 1 changes (increases or decreases) with the increase in the amount of magnetic substances contained in the oil OL. Thus, the PLL circuit 4 increases the tuning voltage V in order to lower the output frequency of the oscillator 3 (see expression (1)), so that the oscillatory frequency of the oscillation circuit may trace the output frequency from the oscillator 3. Thus, by detect the voltage value of the tuning voltage V, i.e., the output frequency from the oscillator 3, the amount of magnetic substances (degradation substances) contained in the oil OL can be detected.

Further, as illustrated in FIG. 1, the oil state detection apparatus includes the coil 1, the capacitor 2, the oscillator 3, and the PLL circuit 4. Thus, for example, the value of the inductance of the coil 1 can be lowered by increasing the oscillatory frequency of the oscillation circuit (the coil 1 and the capacitor 2). This allows downsizing of the oil state detection apparatus. In addition, the oscillator 3 is normally configured of a semiconductor element. Thus, various output frequencies can be provided without replacing the oscillator 3 with an oscillator of another size.

(First Variation)

Figure 3:
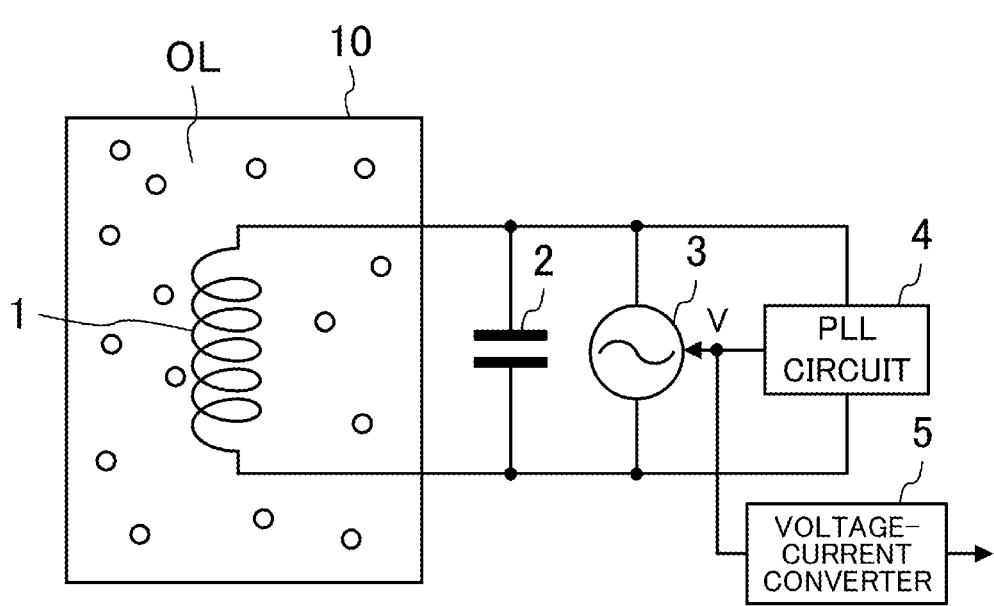
FIG. 3 is a block diagram illustrating an oil state detection apparatus according to a first variation of the first embodiment.

FIG. 3 is a block diagram illustrating an oil state detection apparatus according to a first variation of the first embodiment. As illustrated in FIG. 3, the output of the PLL circuit 4 is in connection with the voltage-current converter 5.

The voltage-current converter 5 converts the voltage value of the tuning voltage V output from the PLL circuit 4 into a current value corresponding to the voltage value, and outputs the current value. In outputting the current value, the voltage-current converter 5 outputs a current from which noise components superimposed on the tuning voltage V have been removed. In this way, the disturbance noise superimposed on the tuning voltage V is removed, so that the amount of magnetic substances (degradation substances) contained in the oil OL can be detected more accurately.

(Second Variation)

Figure 4:
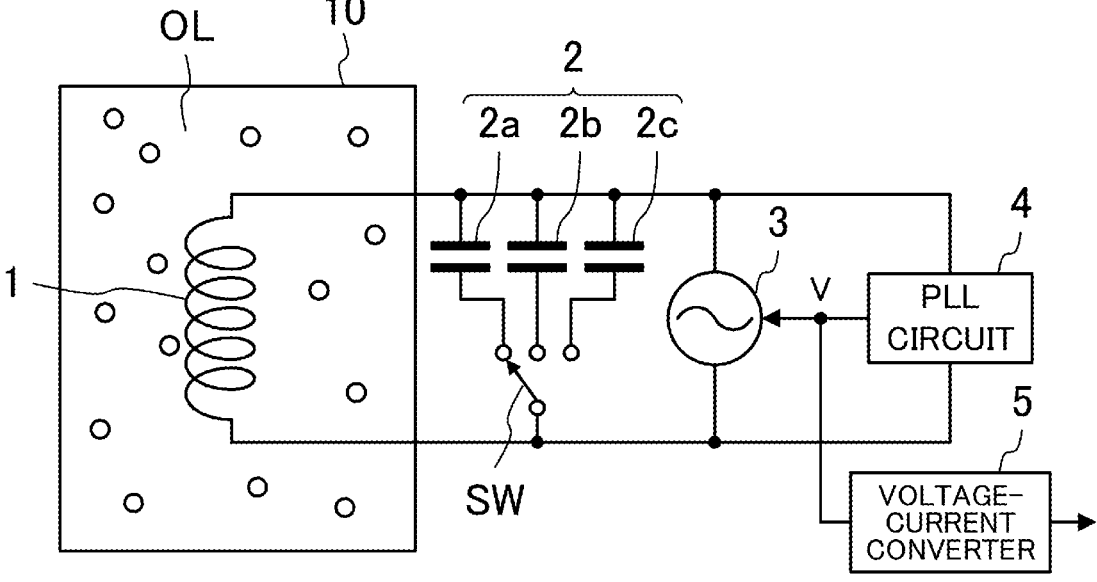
FIG. 4 is a block diagram illustrating an oil state detection apparatus according to a second variation of the first embodiment.

FIG. 4 is a block diagram illustrating an oil state detection apparatus according to the second variation of the first embodiment. As illustrated in FIG. 4, the capacitor 2 includes a plurality of capacitors (in this example, capacitors 2a to 2c). One ends of the capacitors 2a to 2c are in connection with a switch SW, and their capacity values differ from each other. Therefore, by switching the switch SW, the capacitor 2 in the oscillation circuit can be switched among the capacitors 2a to 2c.

In this variation, the oscillatory frequency of the oscillation circuit can be changed by switching the switch SW. This increases the range of the detectable amount of magnetic substances (degradation substances).

Further, this configuration also make it possible to change detectable types and sizes (the thicknesses or the sizes) of the magnetic substances. For example, a frequency characteristic of the magnetic permeability varies depending on the type and the size (the thickness or the size) of the magnetic substances. Further, the frequency characteristic of the magnetic permeability has a local vertex (peak). Thus, by switching the switch SW to change the oscillatory frequency of the oscillation circuit, the type and the size (the thickness or the size) of the detectable magnetic substances can be changed.

In this variation, even if capacitor 2 (capacitors 2a to 2c) is replaced with a capacity variable capacitor which can change its capacity value, the same effect can be exhibited.

(Third Variation)

Figure 5:
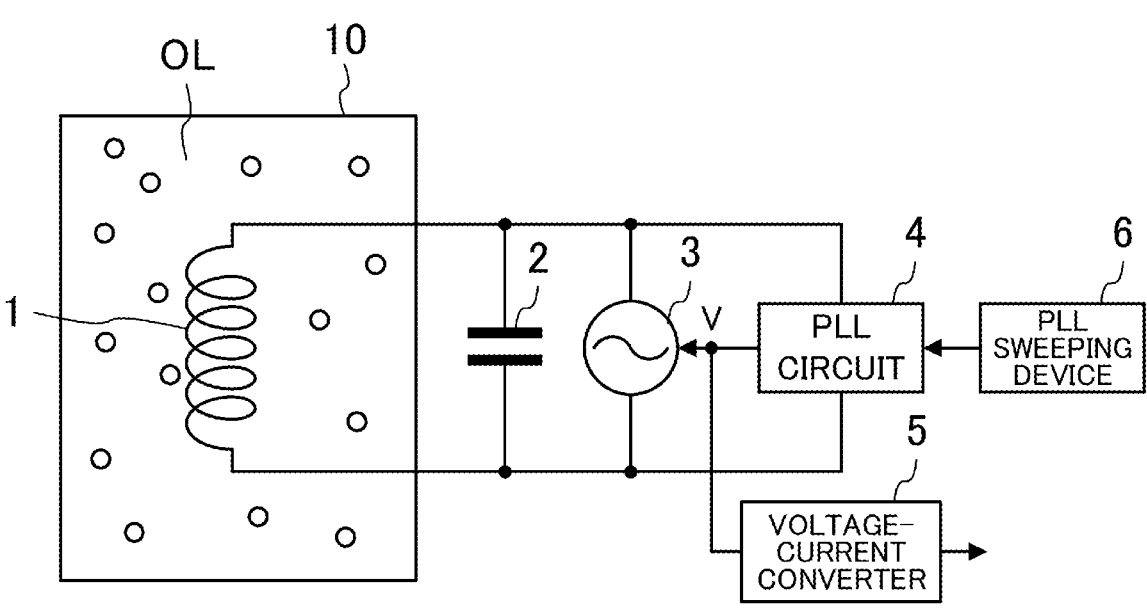
FIG. 5 is a block diagram illustrating an oil state detection apparatus according to a third variation of the first embodiment.

FIG. 5 is a block diagram illustrating an oil state detection apparatus according to a third variation of the first embodiment. As illustrated in FIG. 5, a PLL sweeping device 6 is connected to an input of the PLL circuit 4.

The PLL sweeping device 6 controls the PLL circuit 4, and sweeps the output frequency output from the oscillator 3 within a predetermined band. More specifically, the PLL sweeping device 6 performs control to periodically change the output frequency output from the oscillator 3 (e.g., control such that the output frequency is output in a waveform such as the sine wave and the chopping wave). For example, when the output frequency from the oscillator 3 is constant, the constant frequency is influenced by the change in the fluid (oil OL), and, therefore, the amount of magnetic substances cannot be stably detected. Thus, it may be so configured that the output frequency from the oscillator 3 is changed, so that the detection is performed to obtain tuning voltages V at different output frequencies and the tuning voltages V thus obtained are averaged. With this configuration, the amount of magnetic substances can be stably detected without the influence that would affect the detection when the output frequency is a constant (specific) frequency.

(Fourth Variation)

Figure 6:
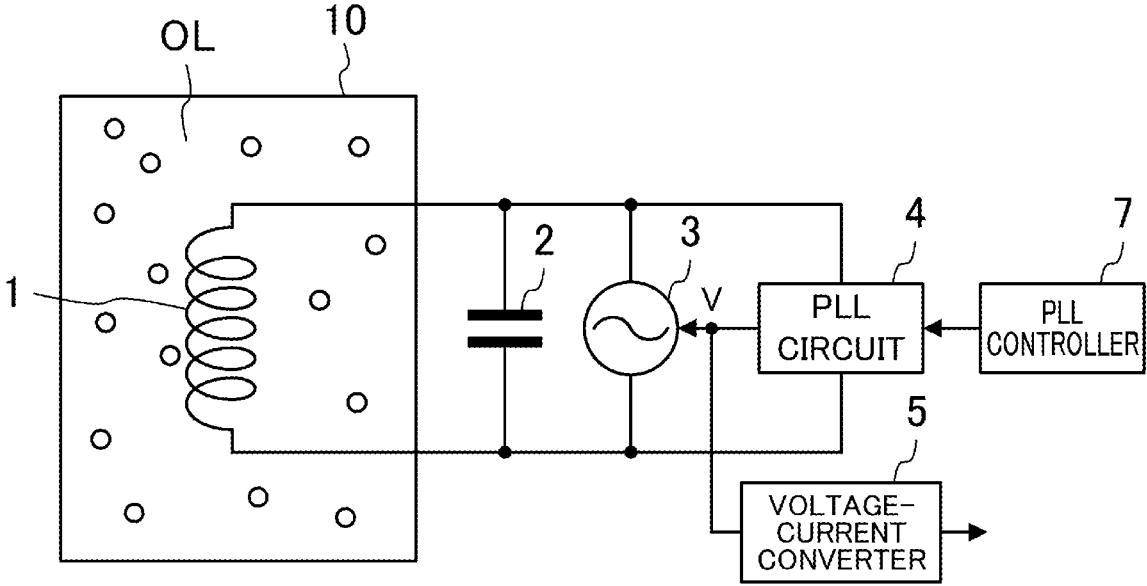
FIG. 6 is a block diagram illustrating an oil state detection apparatus according to a fourth variation of the first embodiment.

FIG. 6 is a block diagram illustrating an oil state detection apparatus according to a fourth variation of the first embodiment. As illustrated in FIG. 6, a PLL controller 7 is connected to an input of the PLL circuit 4.

As mentioned above, the PLL circuit 4 causes the oscillatory frequency of the oscillation circuit to follow the output frequency from the oscillator 3. The PLL controller 7 controls the phase comparison frequency of the PLL circuit 4, so as to control a responding speed, at which the output frequency from the oscillator 3 traces the oscillatory frequency of the oscillation circuit. For example, in case where the PLL controller 7 sets a high responding speed of the output frequency from the oscillator 3, at which the output frequency from the oscillator 3 follows the oscillatory frequency of the oscillation circuit, the tuning voltage V varies more sensitively. This allows detection of the magnetic substances that passes through the coil 1 at a high speed. In case where the PLL controller 7 sets a low responding speed of the output frequency from the oscillator 3, at which the output frequency from the oscillator 3 follows the oscillatory frequency of the oscillation circuit, the tuning voltage V varies less sensitively. This allows stable detection of the amount of the magnetic substances.
(Fifth Variation)

Figures 7, 8:
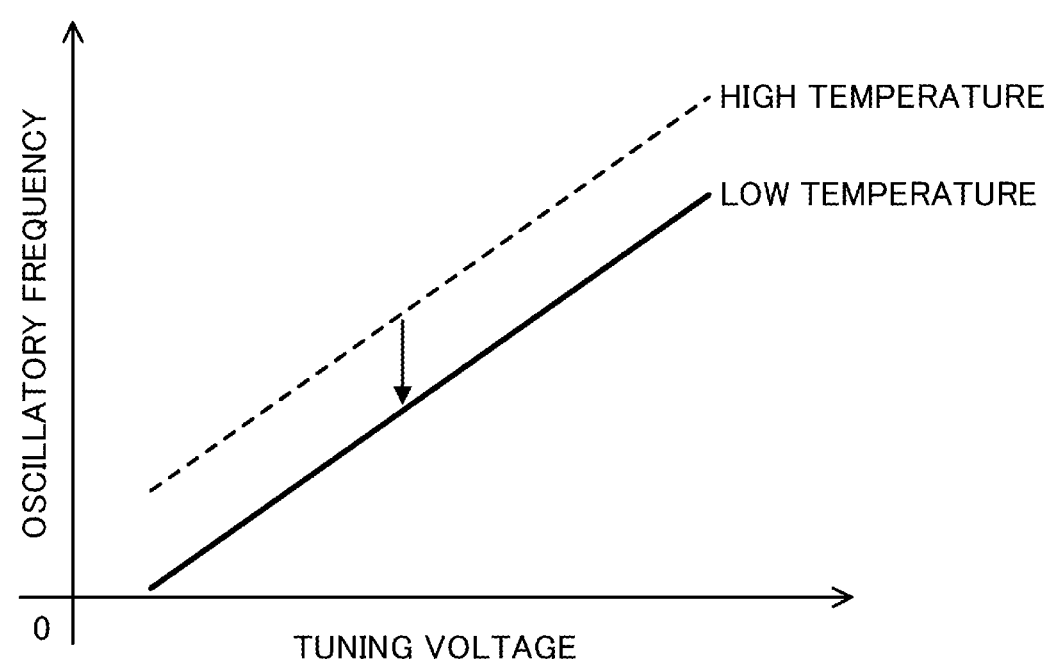
FIG. 7 is a block diagram illustrating an oil state detection apparatus according to a fifth variation of the first embodiment.
FIG. 8 is a graph showing a relationship between an oscillatory frequency of an oscillation circuit and the tuning voltage when the temperature of the oil OL changes.

FIG. 7 is a block diagram illustrating an oil state detection apparatus according to a fifth variation of the first embodiment. As illustrated in FIG. 7, the oil state detection apparatus according to this variation includes a capacitor 8, a temperature sensor 81, and a digital to analog converter (DAC) circuit 82. The capacitor 8 is a capacity variable capacitor, and is connected to the coil 1, the capacitor 2, the oscillator 3, and the PLL circuit 4.

The temperature sensor 81 is a sensor configured to detect a temperature of the oil OL or a circuit ambient temperature of the oscillator 3 or the like. The DAC circuit 82 changes the capacity of the capacitor 8 in accordance with the temperature of the oil OL output from the temperature sensor 81 or the circuit ambient temperature of the oscillator 3 or the like.

FIG. 8 is a graph showing a relationship between the oscillatory frequency of the oscillation circuit and the tuning voltage when the temperature of the oil OL changes. In FIG. 8, the vertical axis indicates the oscillatory frequency of the oscillation circuit configured of the coil 1 and the capacitor 2, and the horizontal axis indicates the tuning voltage V. In FIG. 8, the dashed line indicates the relationship between the oscillatory frequency and the tuning voltage V in the case where the temperature of the oil OL is high, and the solid line indicates the relationship between the oscillatory frequency and the tuning voltage V in the case where the temperature of the oil OL is low. In both cases, the amount of the magnetic substances contained in the oil OL is the same.

As illustrated in FIG. 8, the higher the temperature is, the higher the frequency of the oscillation circuit is. As a result, the tuning voltage V increases. This is because a value of the inductance L of the coil 1 increases with the increase in temperature of the oil OL. Thus, in this variation, the temperature sensor 81 detects a temperature of the oil OL, and the DAC circuit 82 lowers the capacity of the capacitor 8 (see the equation (1)) in accordance with the result of the detection, whereby the change in the tuning voltage V with temperature changes, i.e., the change in the oscillatory frequency of the oscillator 3 with temperature changes can be reduced.
(Sixth Variation)

Figures 9A, 9B:
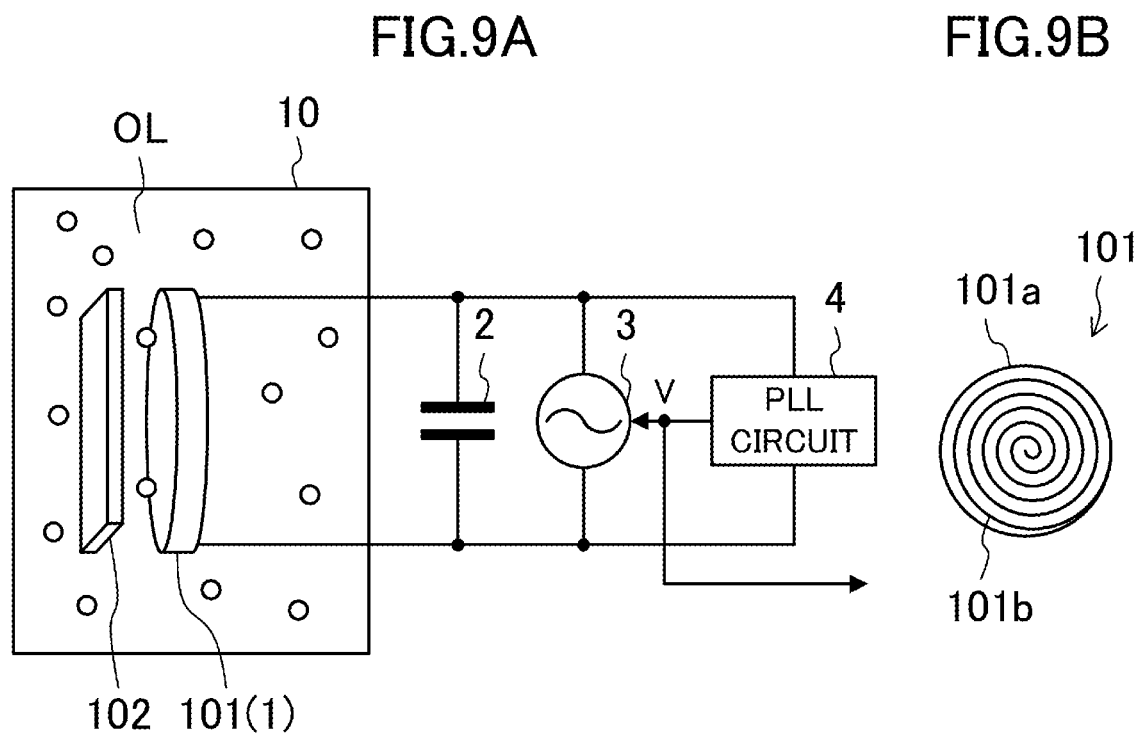
FIG. 9A is a block diagram illustrating an oil state detection apparatus according to a sixth variation of the first embodiment.
FIG. 9B is a front view of a planar coil 101.

FIG. 9A is a block diagram illustrating an oil state detection apparatus according to a sixth variation of the first embodiment. As illustrated in FIG. 9A, in this variation, the coil 1 is a planar coil 101, and a conductor board 102 is provided to face the planar coil 101. The conductor board 102 may be configured of, for example, metal such as iron and aluminum, or a dielectric substance. The conductor board 102 may not be planar, and may have a mesh shape.

FIG. 9B is a plan view of the planar coil 101. As illustrated in FIG. 9B, the planar coil 101 includes a dielectric substrate 101a made of, for example, FR-4 or fluorine, and a metal foil pattern 101b (a metal pattern) on the dielectric substrate 101a. The conductor board 102 is provided to face the planar coil 101. This allows reduction in leakage of magnetic flux of the planar coil 101. In the case where the coil 1 is the planar coil 101, the planar coil 101 can be made of a printed board and thus can be made with higher accuracy than a winding coil and can be made thin. In addition, mass production of the planar coil 101 can be achieved at low cost.

Figure 10:
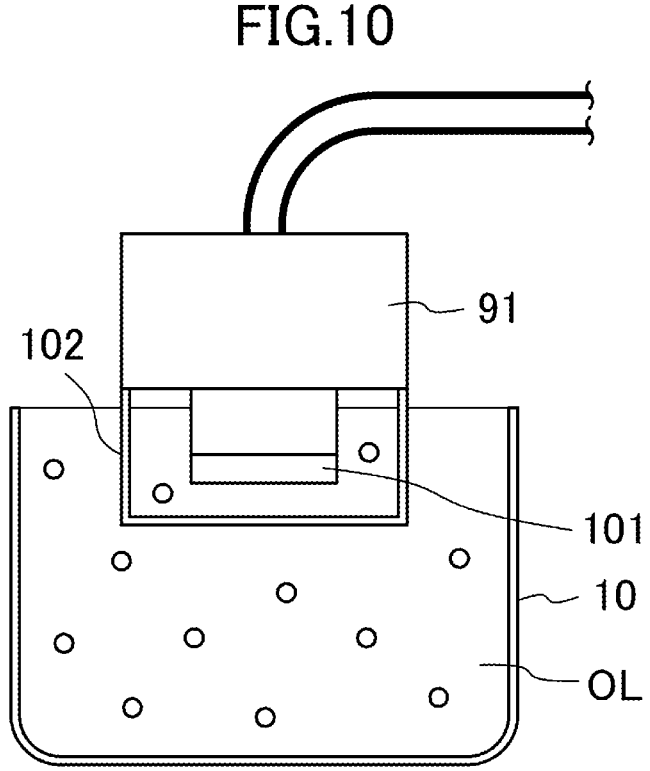
FIG. 10 is a sectional view of the oil state detection apparatus of FIG. 9.

FIG. 10 is a sectional view of the oil state detection apparatus of FIG. 9. As illustrated in FIG. 10, the planar coil 101 and the conductor board 102 are unitized in a sensor circuit unit 91 (housing). More specifically, the planar coil 101 is provided on the lower surface of the sensor circuit unit 91 housing the capacitor 2 and the oscillator 3. The conductor board 102 is provided in such a way that the conductor board 102 covers the planar coil 101 with a predetermined space therebetween. This allows the same effect as in FIG. 1 to be exhibited.

Second Embodiment

Figure 11:
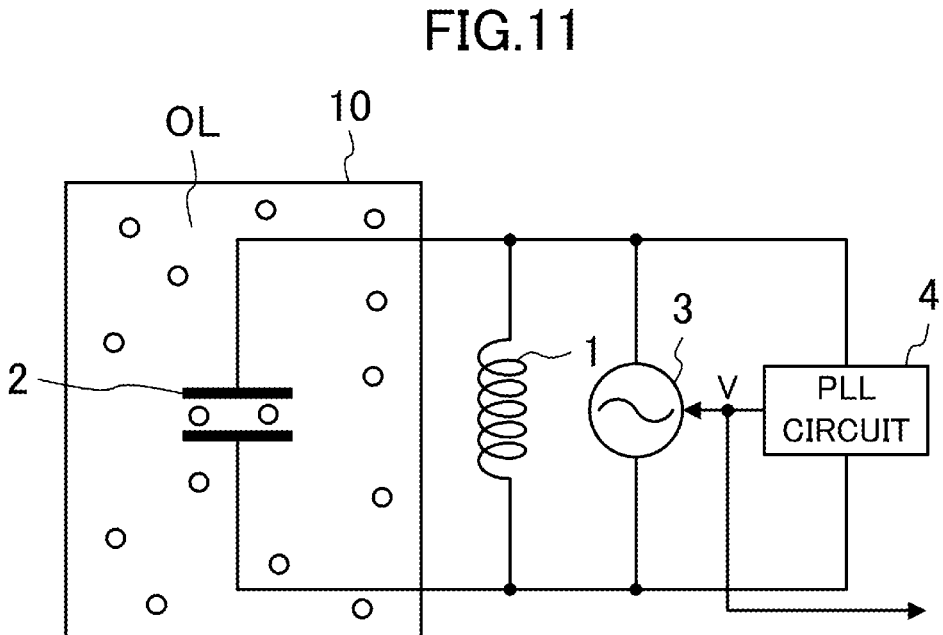
FIG. 11 is a block diagram illustrating an oil state detection apparatus according to a second embodiment.

FIG. 11 is a block diagram illustrating an oil state detection apparatus according to a second embodiment. FIG. 11 differs from FIG. 1 in that the capacitor 2 is immersed in the oil OL instead of the coil 1.

In the configuration in which the capacitor 2 is immersed in the oil OL as illustrated in FIG. 11, the dielectric constant between electrodes of the capacitor 2 changes with the increase in the amount of the dielectric substances and the conductors contained in the oil OL. As a result, the capacity value of the capacitor 2 changes. With this change, the oscillatory frequency of the oscillation circuit changes (see the equation (1)). Thus, by detecting the voltage value of the tuning voltage V, i.e., the oscillatory frequency of the oscillator 3, the amount of the dielectric substances and the conductors (the amount of the degradation substances) contained in the oil OL can be detected.
(First Variation)

Figure 12:
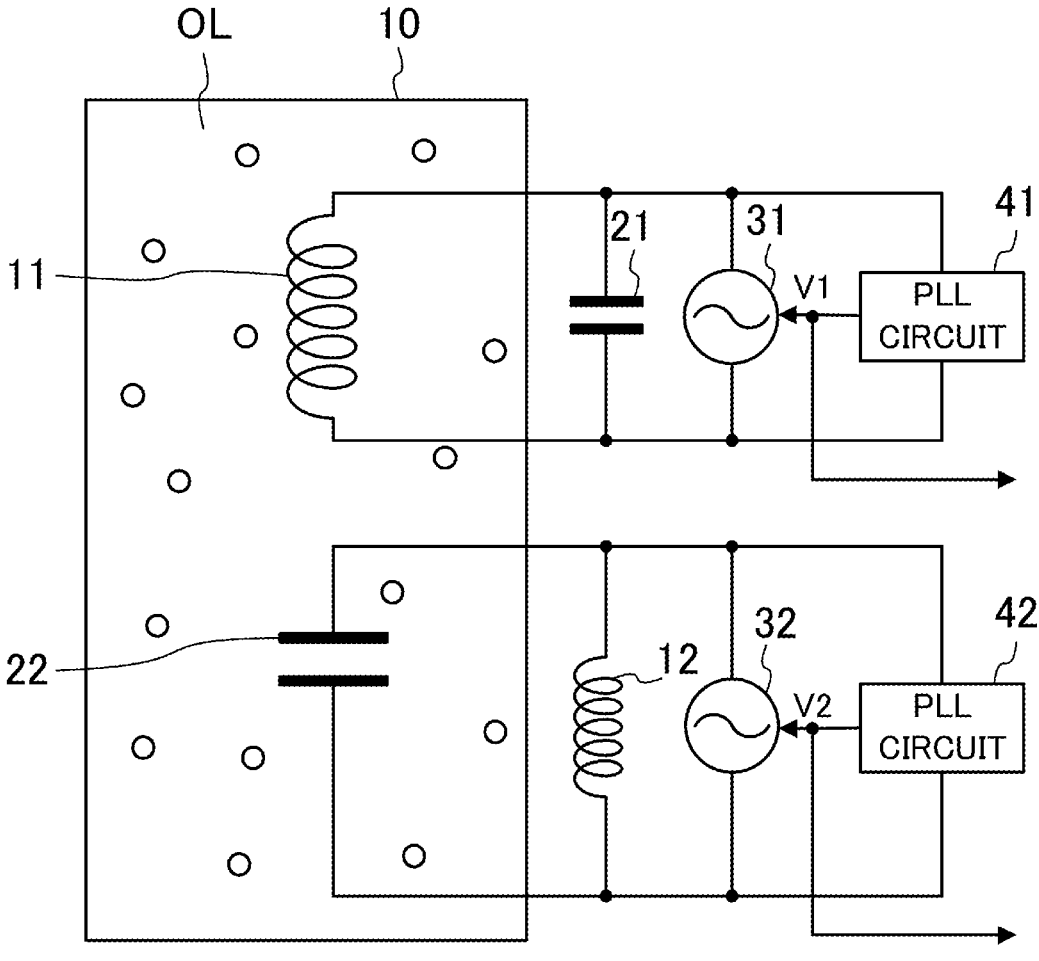
FIG. 12 is a block diagram illustrating an oil state detection apparatus according to a first variation of the second embodiment.

FIG. 12 is a block diagram illustrating an oil state detection apparatus according to a first variation of the second embodiment. In FIG. 12, the oil state detection apparatus according to this variation includes a circuit including a coil 11 (first coil), a capacitor 21 (first capacitor), an oscillator 31, and a PLL circuit 41, and a circuit including a coil 12 (second coil), a capacitor 22 (second capacitor), an oscillator 32, and a PLL circuit 42. The oscillator 31 and the PLL circuit 41 correspond to the first detection device, and the oscillator 32 and the PLL circuit 42 correspond to the second detection device. In FIG. 12, the first oscillation circuit is configured of the coil 11 and the capacitor 21, and the second oscillation circuit is configured of the coil 12 and the capacitor 22.

As illustrated in FIG. 12, the coil 11 and the capacitor 22 are immersed in the oil OL. Thus, by detecting voltage values of the tuning voltages V1 and V2 of the PLL circuits 41 and 42, i.e., the oscillatory frequencies of the oscillators 31 and 32, the amount of the magnetic substances, the dielectric substances, and the conductors (the amount of degradation substances) contained in the oil OL can be detected.
(Second Variation)

Figure 13:
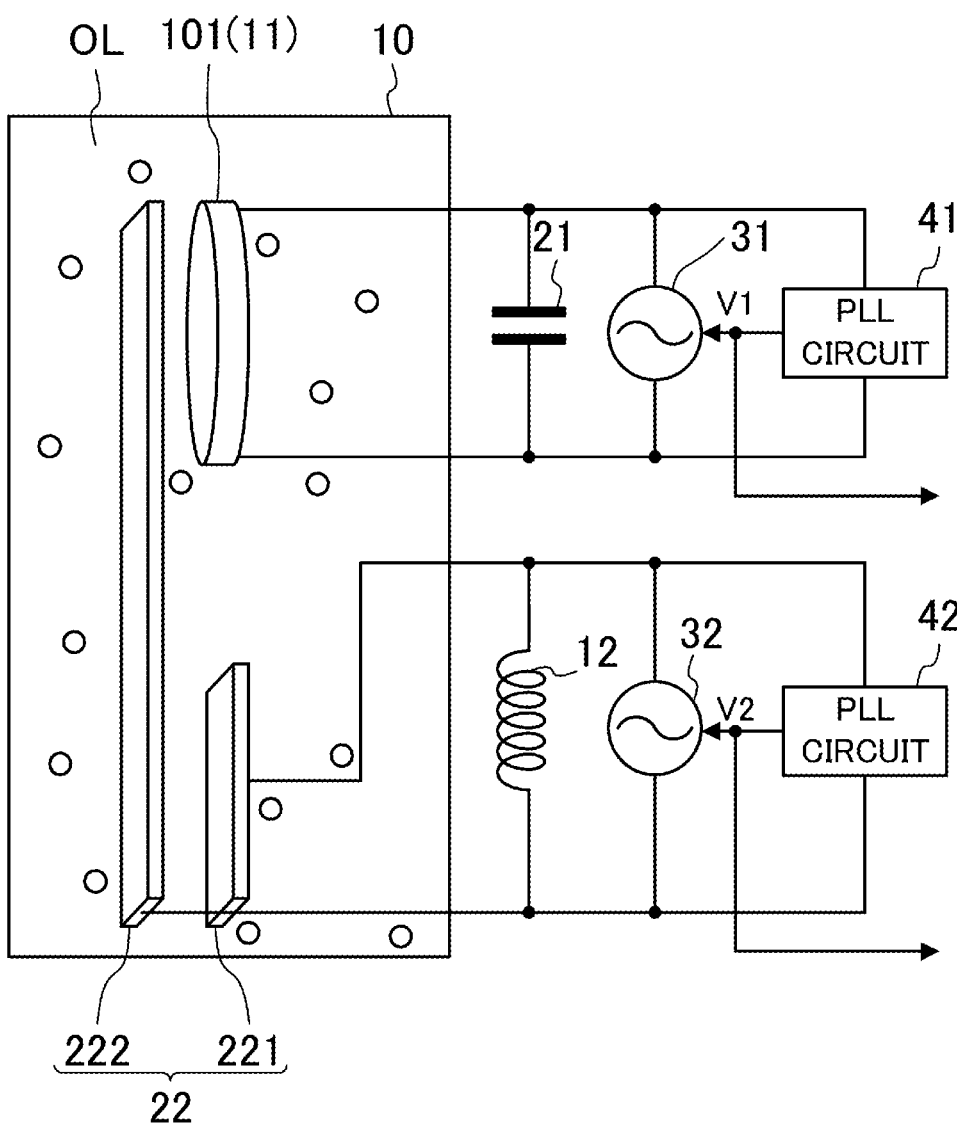
FIG. 13 is a block diagram illustrating an oil state detection apparatus according to a second variation of the second embodiment.

FIG. 13 is a block diagram illustrating an oil state detection apparatus according to a second variation of the second embodiment. FIG. 13 differs from FIG. 12 in that the coil 11 is a planar coil 101. Further, an electrode plate 222 faces an electrode plate 221 and the planar coil 101. The electrode plates 221 and 222 constitute a capacitor 22. The electrode plate 222 is provided to face the planar coil 101. This allows reduction in leakage of magnetic flux of the planar coil 101. In this variation, the planar coil 101 and the electrode plate 222 are disposed to face each other. However, instead of causing the planar coil 101 and the electrode plate 222 to face each other, a conductor board 102 may be further provided, which faces the planar coil 101. This makes it possible to reduce adverse effects such as sneaking of the magnetic field and the electric field from the electrode plate 222 to the planar coil 101.

Figure 14:
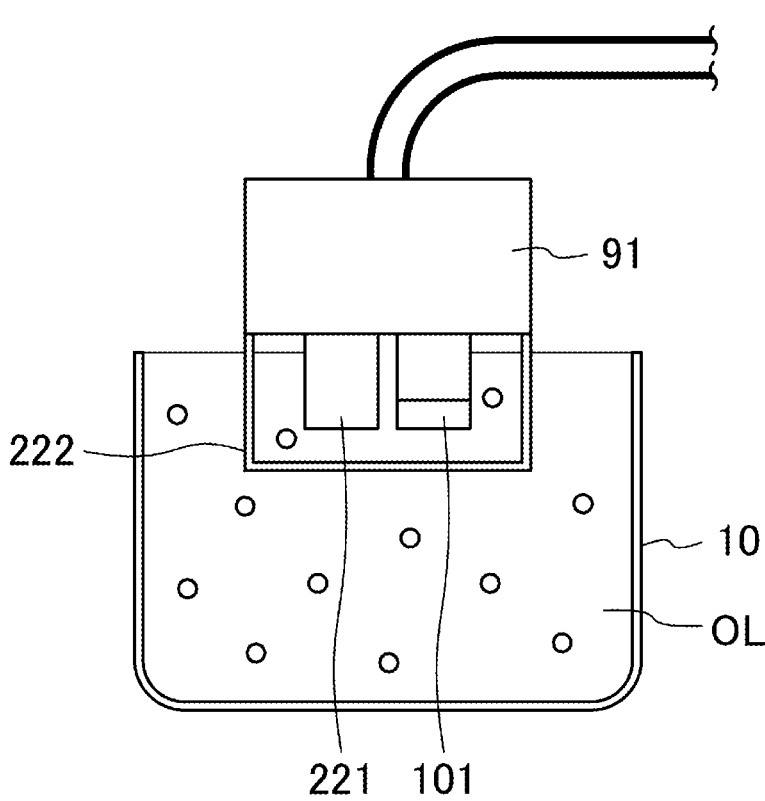
FIG. 14 is a sectional view of the oil state detection apparatus of FIG. 13.

FIG. 14 is a sectional view of the oil state detection apparatus of FIG. 13. As illustrated in FIG. 14, the planar coil 101 and the electrode plates 221 and 222 are unitized in a sensor circuit unit 91 (housing). More specifically, the planar coil 101 and the electrode plate 222 are provided on the lower surface of the sensor circuit unit 91 housing oscillators 31 and 32, a coil 12, and a capacitor 21. The electrode plate 222 is provided in such a way that the electrode plate 222 covers the planar coil 101 and the electrode plate 222 with a predetermined space from the electrode plate 222 to the planar coil 101 or the electrode plate 221. This allows the same effect as in FIG. 12 to be exhibited.

The embodiments have been described above as examples of the technology disclosed herein. However, the technology herein is not limited to this, and can be applied to embodiments with modifications, substitutions, additions, omissions, and the like, as appropriate.

In the embodiments and the variations described above, the oscillatory frequency of each oscillation circuit is detected by the detection apparatus (oil state detection apparatus) configured of the oscillator and the PLL circuit. However, the detection apparatus may be configured of components other than the oscillator and the PLL circuit. The detection apparatus may be of any configuration as long as the oscillatory frequency of the oscillation circuit is detected.

Figure 15:
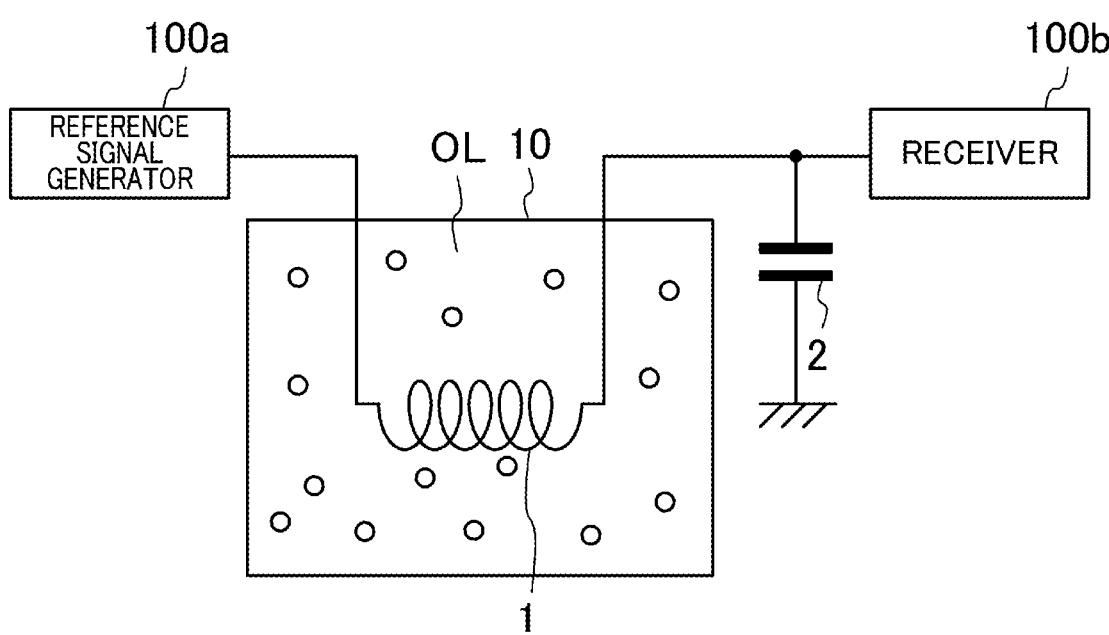
FIG. 15 is a block diagram illustrating an oil state detection apparatus according to another example of the first embodiment.

For example, the detection apparatus may be configured as illustrated in FIG. 15. In FIG. 15, the detection apparatus includes a coil 1, a capacitor 2, a reference signal generator 100a, and a receiver 100b. The reference signal generator 100 outputs a predetermined reference signal (of pulse wave or sin wave) on the coil 1 and the capacitor 2. The receiver 100b receives the reference signal output from the reference signal generator 100 via the coil 1 and the capacitor 2. As mentioned above, the inductance L of the coil 1 varies in accordance with the amount of magnetic substances contained in the oil OL. Thus, by comparing the signal strength of the reference signal received by the receiver 100b and signal strength of the reference signal output from the reference signal generator 100, the amount of magnetic substances contained in the oil OL can be detected. In FIG. 15, the coil 1 is immersed in the oil OL. However, instead of the coil 1, the capacitor 2 may be immersed in the oil OL to detect the amount of dielectric substances and conductors contained in the oil OL.

Further, in the embodiments and the variations, the detection apparatus includes the PLL circuit 4 (41, 42), but is not limited thereto. For example, the detection apparatus may include, instead of the PLL circuit 4, an arithmetic circuit configured to analyze a frequency input, and an analysis circuit configured to analyze a frequency by lowering the frequency input.

In any of the variations of the first embodiment, instead of the coil 1, the capacitor 2 may be immersed in the oil OL. According to any of the variations of the first embodiment configured as such, the amount of dielectric substances (degradation substances) contained in the oil OL can be also detected with the advantageous effect of the variation.

When the capacitor 2 is immersed in the oil OL instead of the coil 1 in the second variation (FIG. 4) of the first embodiment, the coil 1 may include a plurality of coils whose inductance values differ from each other and be switchable between the plurality of coils. This configuration can provide a wider detectable range of the amount of dielectric substances and conductors. In such a case, the coil 1 may be a variable coil which can change the inductance value.

In the embodiments and variations thereof, each detection apparatus is provided with a coil 1 (11, 12) and a capacitor 2 (21, 22), but the present disclosure is not limited to such configurations. For example, the coil 1 (11, 12) may be a semiconductor provided on a circuit board in the detection apparatus, or may be a coil component of wiring. The capacitor 2 (21, 22) may be a semiconductor provided on a circuit board in the detection apparatus, or may be a wiring capacity. That is, the coil 1 (11, 12) and the capacitor 2 (21, 22) do not need to be provided as individual components.

In the embodiments and variations thereof, the coil 1 (11, 12), the capacitor 2 (21, 22), and the oscillator 3 (31, 32) are connected in parallel. However, this is a mere example of the circuit configuration in the detection apparatus, and the detection apparatus may have any circuit configuration as long as the constituent elements described above are included. For example, in the detection apparatus, the coil 1 (11, 12), the capacitor 2 (21, 22), and the oscillator 3 (31, 32) may be connected in series.

INDUSTRIAL APPLICABILITY

The oil state detection apparatus of the present disclosure is applicable to detect the amount of degradation substances such as magnetic substances and dielectric substances contained in oil used as lubricant in construction machinery and vehicles.

DESCRIPTION OF REFERENCE CHARACTERS 1 (11) Coil (First Coil, First Oscillation Circuit)

12 Coil (Second Coil, Second Oscillation Circuit)

101 Planar Coil

101a Dielectric Substrate

101b Metal Foil Pattern (Metal Pattern)

102 Conductor Board 2 (21, 2a to 2c) Capacitor (First Capacitor, First Oscillation Circuit)

22 Capacitor (Second Capacitor, Second Oscillation Circuit)

221, 222 Electrode Plates 3 (31) Oscillator (First Oscillator)

32 Oscillator (Second Oscillator)

4 (41) PLL Circuit (First PLL Circuit)

42 PLL Circuit (Second PLL Circuit)

5 Voltage-Current Converter

6 PLL Sweeping Device

7 PLL Controller

8 Capacitor (Capacity Variable Capacitor)

81 Temperature Sensor

82 DAC Circuit

91 Sensor Circuit Unit (Housing)

OL Oil

What is claimed is:

1. An oil state detection apparatus, comprising:
a first oscillation circuit including a first coil and a first capacitor, and
a first detection device,
the first coil being configured to be immersed in oil, the first capacitor being configured not to be immersed in the oil,
the first detection device being configured to detect an oscillatory frequency of the first oscillation circuit and to detect an amount of magnetic substances contained in the oil based on the oscillatory frequency,
the oil state detection apparatus including only the first oscillation circuit as an oscillation circuit for detecting the amount of the magnetic substances.

2. The oil state detection apparatus of claim 1, wherein:
the first detection device comprises an oscillator and a phase-locked loop (PLL) circuit for the first oscillation circuit, and
the PLL circuit is configured to input a tuning voltage to the oscillator in such a way that an output frequency output from the oscillator matches the oscillatory frequency.

3. The oil state detection apparatus of claim 2, wherein the first detection device further comprises a voltage-current converter configured to convert the tuning voltage to a current.

4. The oil state detection apparatus of claim 2, wherein the first detection device further comprises a PLL sweeping device configured to sweep the output frequency within a predetermined band.

5. The oil state detection apparatus of claim 2, wherein the first detection device further comprises a PLL controller configured to control a responding speed of the output frequency, at which the output frequency follows the oscillatory frequency.

6. The oil state detection apparatus of claim 1, wherein:
the first oscillation circuit further comprises:
a capacity variable capacitor;
a temperature sensor for detecting a temperature of the oil or a temperature of a circuit configured in the oil state detection apparatus; and a digital to analog converter (DAC) circuit configured to control a capacity value of the capacity variable capacitor in accordance with a result of the detection by the temperature sensor.

7. The oil state detection apparatus of claim 1, wherein:
the first coil is configured to be immersed in the oil,
the first capacitor comprises a plurality of capacitors whose capacities differ from each other, and
the first oscillation circuit is configured to be switchably in connection with either one of the plurality of capacitors as the first capacitor.

8. The oil state detection apparatus of claim 1, wherein:
the first coil is configured to be immersed in the oil, and
the first coil includes a dielectric substrate having a planar shape, and a metal pattern provided on the dielectric substrate.

9. The oil state detection apparatus of claim 8, further comprising:
a conductor board provided to face the first coil, wherein the first coil and the conductor board are unitized in a housing.

10. The oil state detection apparatus of claim 1, further comprising:
a second oscillation circuit including a second coil and a second capacitor, and
a second detection device,
the first coil and the second capacitor being configured to be immersed in oil, and
the second detection device being configured to detect an amount of dielectric substances and conductors contained in the oil based on an oscillatory frequency of the second oscillation circuit.

11. The oil state detection apparatus of claim 10, wherein:
the first coil includes a dielectric substrate having a planar shape, and a metal pattern provided on the dielectric substrate, and
either one of electrode plates in a pair constituting the second capacitor is provided to face the first coil.

12. The oil state detection apparatus of claim 11, wherein the first coil and the second capacitor are unitized in a housing.

* * * * *